United States Patent
Wu et al.

(10) Patent No.: US 12,035,242 B2
(45) Date of Patent: Jul. 9, 2024

(54) PDCCH MONITORING METHOD AND TERMINAL

(71) Applicant: VIVO MOBILE COMMUNICATION CO., LTD., Guangdong (CN)

(72) Inventors: Kai Wu, Guangdong (CN); Xiaodong Shen, Guangdong (CN); Dajie Jiang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 380 days.

(21) Appl. No.: 17/548,924

(22) Filed: Dec. 13, 2021

(65) Prior Publication Data

US 2022/0104132 A1 Mar. 31, 2022

Related U.S. Application Data

(63) Continuation of application No. PCT/CN2020/095589, filed on Jun. 11, 2020.

(30) Foreign Application Priority Data

Jun. 17, 2019 (CN) .......................... 201910522132.3

(51) Int. Cl.
  *H04W 52/02* (2009.01)
  *H04W 72/23* (2023.01)

(52) U.S. Cl.
  CPC ... *H04W 52/0232* (2013.01); *H04W 52/0235* (2013.01); *H04W 72/23* (2023.01)

(58) Field of Classification Search
  CPC ......... H04W 52/0232; H04W 52/0235; H04W 72/23; H04W 76/28; Y02D 30/70
  USPC ....................................................... 370/329
  See application file for complete search history.

(56) References Cited

U.S. PATENT DOCUMENTS

| | | | |
|---|---|---|---|
| 2018/0176883 A1 | 6/2018 | Fujishiro et al. | |
| 2018/0332549 A1 | 11/2018 | Bhattad et al. | |
| 2019/0239160 A1 | 8/2019 | Lee et al. | |
| 2020/0245302 A1 | 7/2020 | Pan et al. | |
| 2022/0159574 A1* | 5/2022 | Islam ................ | H04W 52/0219 |

(Continued)

FOREIGN PATENT DOCUMENTS

| | | |
|---|---|---|
| CN | 109391971 A | 2/2019 |
| CN | 109842937 A | 6/2019 |

(Continued)

OTHER PUBLICATIONS

"PDCCH-based power saving signal/channel" Vivo 3GPP TSG RAN WG1 #97 R1-1906170 (published May 13-17, 2019) (Year: 2019).*

CATT, "Report on [105bis#27][NR/Power Saving]—PDCCH skipping", 3GPP TSG-RAN WG2 Meeting #106, R2-1905665, Reno, Nevada, USA, May 13-17, 2019.

(Continued)

*Primary Examiner* — Robert J Lopata
(74) *Attorney, Agent, or Firm* — Price Heneveld LLP

(57) ABSTRACT

Embodiments of this disclosure provide a PDCCH monitoring method and a terminal. The method includes: receiving configuration information sent by a network device, where the configuration information is used to configure a monitoring duration; determining M first monitoring durations from monitoring durations in each DRX cycle, where M is a positive integer, and the number N of monitoring durations in at least one DRX cycle is greater than M; and monitoring a PDCCH in the M first monitoring durations, where the PDCCH is used to transmit power saving indication information.

20 Claims, 4 Drawing Sheets

(56) References Cited

U.S. PATENT DOCUMENTS

2022/0256622 A1* 8/2022 Li ..................... H04W 52/0216
2022/0264464 A1* 8/2022 Seo ....................... H04W 72/23
2022/0377670 A1* 11/2022 Xue .................. H04W 52/0235

FOREIGN PATENT DOCUMENTS

| EP | 3456083 A0 | 5/2016 |
|---|---|---|
| IN | 109792792 A | 5/2019 |
| WO | 2017026188 A1 | 2/2017 |
| WO | 2017196249 A1 | 11/2017 |
| WO | 2019099176 A1 | 5/2019 |

OTHER PUBLICATIONS

Panasonic, "Discussion on PDCCH-based power saving signal/channel (PoSS)", 3GPP TSG RAN WG1 #97, R1-1907363, Reno, USA, May 13-17, 2019.

Samsung, "PDCCH-based power saving signal/channel", 3GPP TSG RAN WG1 #97, R1-1906980, Reno, USA, May 13-17, 2019.

ZTE, "Discussion on Potential Techniques for UE Power Saving", 3GPP TSG RAN WG1 #97, R1-1906641, Reno, USA, May 13-17, 2019.

CATT, "PDCCH skipping and switching of PDCCH monitoring periodicity", 3GPP TSG RAN WG1 Meeting #97, R1-1906353, Reno, USA, May 13-17, 2019.

CATT, "PDCCH-Based Power Saving Signal/Channel Design", 3GPP TSG RAN WG1 Meeting #97, R1-1906350, Reno, USA, May 13-17, 2019.

* cited by examiner

PDCCH MONITORING METHOD AND TERMINAL

CROSS-REFERENCE TO RELATED APPLICATIONS

This application is a continuation application of International Application No. PCT/CN2020/095589 filed on Jun. 11, 2020, which claims priority to Chinese Patent Application No. 201910522132.3, filed in China on Jun. 17, 2019, which are incorporated herein by reference in their entireties.

TECHNICAL FIELD

This disclosure relates to the field of communications technologies, and in particular, to a PDCCH monitoring method and a terminal.

BACKGROUND

Before a terminal in an idle state or a radio resource control connected state (RRC connected state) performs discontinuous reception (DRX) in each DRX cycle, a base station transmits a wake-up signal to the UE. The UE wakes up at the corresponding time and performs detection for the wake-up signal. If the UE detects the wake-up signal, the UE performs physical downlink control channel (PDCCH) monitoring in DRX on duration; otherwise, the UE does not perform PDCCH monitoring in the DRX on duration, that is, the UE skips this DRX and continues to sleep.

In the related art, a network device transmits a wake-up signal through a PDCCH only when UE needs to be awakened. If monitoring is not required in a next DRX cycle, the network device may not transmit any PDCCH, thereby reducing overheads on the network device. In this case, if the UE does not successfully receive the wake-up signal, the UE may miss subsequent DRX monitoring, leading to a large delay in data transmission. Then it is required to consider enhancing the PDCCH transmission and UE monitoring to ensure performance of the wake-up signal transmission. Therefore, in the related art, in addition to transmitting a wake-up/sleep indication signal indicating whether the PDCCH monitoring is required for the next DRX Onduration, the PDCCH may also transmit information indicating other UE behaviors. In this specification, the PDCCH is referred to as a PDCCH for transmitting power saving indication information (power saving PDCCH).

In a new radio (NR) protocol in the related art, the DRX cycle and the PDCCH are separately configured. Usually, monitoring time resources for power saving indicator signal that are configured using search space may not correspond to DRX cycles in a one-to-one manner. It is very likely that a plurality of power saving PDCCH monitoring resources exist in one DRX cycle, leading to a high power consumption of the terminal.

SUMMARY

Embodiments of this disclosure provide a PDCCH monitoring method and a terminal, to resolve a problem of high power consumption of the terminal due to a plurality of power saving PDCCH monitoring resources present in one DRX cycle.

According to a first aspect, an embodiment of this disclosure provides a PDCCH monitoring method, applied to a terminal and including:

receiving configuration information sent by a network device, where the configuration information is used to configure a monitoring duration;

determining M first monitoring durations from monitoring durations in each DRX cycle, where M is a positive integer, and the number N of monitoring durations in at least one DRX cycle is greater than M; and monitoring a PDCCH in the M first monitoring durations, where the PDCCH is used to transmit power saving indication information.

According to a second aspect, an embodiment of this disclosure further provides a terminal, including:

a receiving module, configured to receive configuration information sent by a network device, where the configuration information is used to configure a monitoring duration;

a determining module, configured to determine M first monitoring durations from monitoring durations in each DRX cycle, where M is a positive integer, and the number N of monitoring durations in at least one DRX cycle is greater than M; and a monitoring module, configured to monitor a PDCCH in the M first monitoring durations, where the PDCCH is used to transmit power saving indication information.

According to a third aspect, an embodiment of this disclosure further provides a terminal, including a memory, a processor, and a program stored in the memory and capable of running on the processor, where when the program is executed by the processor, the steps of the foregoing PDCCH monitoring method are implemented.

According to a fourth aspect, an embodiment of this disclosure further provides a computer-readable storage medium, where the computer-readable storage medium stores a computer program, and when the computer program is executed by a processor, the steps of the foregoing PDCCH monitoring method are implemented.

In the embodiments of this disclosure, the M first monitoring durations among a plurality of monitoring durations in each DRX cycle are selected for monitoring a power saving PDCCH, so as to obtain corresponding power saving indication information. In this way, in a case that a power saving PDCCH monitoring period does not match the corresponding DRX cycle configured, the power saving PDCCH monitoring can be performed within limited monitoring durations, to reduce power consumption in the power saving PDCCH monitoring, thereby reducing the power consumption of the terminal.

DETAILED DESCRIPTION OF THE EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent giving an example, an instance, or an illustration. Any embodiment or design solution described as "exemplary" or "for example" in the embodiments of this disclosure should not be construed as being more preferred or advantageous than other embodiments or design solutions. Specifically, the terms such as "an example" or "for example" are intended to present related concepts in a specific manner.

The following describes the embodiments of this disclosure with reference to the accompanying drawings. A PDCCH monitoring method and a terminal provided in the embodiments of this disclosure may be applied to a wireless communications system. The wireless communications system may be a 5G system, or an evolved long term evolution (eLTE) system, or a later evolved communications system.

Figure 1:
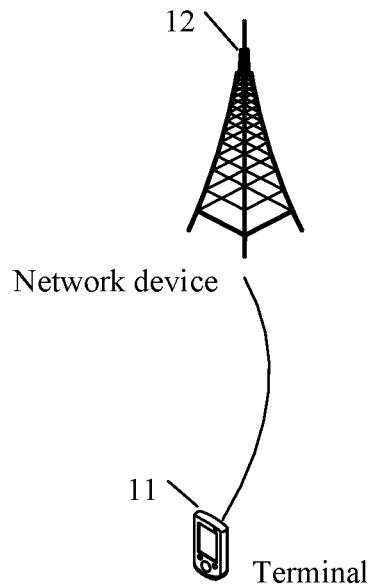
FIG. 1 is a structural diagram of a network system to which an embodiment of this disclosure may be applied.

Referring to FIG. 1, FIG. 1 is a structural diagram of a network system to which an embodiment of this disclosure may be applied. As shown in FIG. 1, the network system includes a terminal 11 and a network device 12. The terminal 11 may be user equipment or other terminal-side devices such as a mobile phone, a tablet personal computer, a laptop computer, a personal digital assistant (PDA), a mobile Internet device (MID), or a wearable device. It should be noted that a specific type of the terminal 11 is not limited in the embodiments of this disclosure. The network device 12 may be a 5G base station, or a base station of a later version, or a base station in other communications systems, or may be referred to as a Node B, or an evolved Node B, or a transmission reception point (TRP), or an access point (AP), or other terms in the field. Provided that a same technical effect is achieved, the network device is not limited to a specific technical term. In addition, the network device 12 may be a master node (MN) or a secondary node (SN). It should be noted that, in the embodiments of this disclosure, the 5G base station is used as only an example, but the network device is not limited to any specific type.

Figure 2:
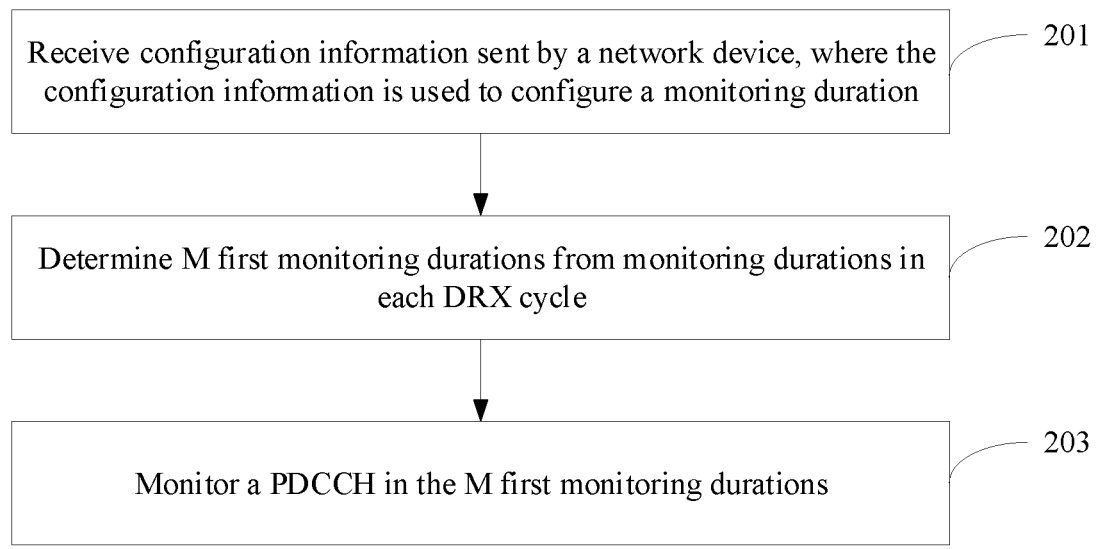
FIG. 2 is a flowchart of a PDCCH monitoring method according to an embodiment of this disclosure.

Referring to FIG. 2, FIG. 2 is a flowchart of a PDCCH monitoring method according to an embodiment of this disclosure. The method is applied to a terminal, and includes the following steps, as shown in FIG. 2.

Step 201. Receive configuration information sent by a network device, where the configuration information is used to configure a monitoring duration.

Step 202. Determine M first monitoring durations from monitoring durations in each DRX cycle, where M is a positive integer, and the number N of monitoring durations in at least one DRX cycle is greater than M.

Step 203. Monitor a PDCCH in the M first monitoring durations, where the PDCCH is used to transmit power saving indication information.

In this embodiment of this disclosure, the network device can be configured with a control resource set CORESET and/or search space, and the terminal can monitor a power saving PDCCH based on the CORESET and/or search space configured by the network device. In an optional embodiment, the monitoring duration can be indicated by the search space. For example, configuration of Search Space of the PDCCH may include: periodicity and offset (monitoring Slot Periodicity And Offset), and monitoring duration. In this embodiment of this disclosure, the monitoring duration configured in foregoing configuration information specifically refers to the monitoring duration that is configured in the duration in search space. The terminal can monitor the power saving PDCCH in the monitoring duration to obtain the power saving indication information transmitted on the power saving PDCCH.

For example, in an optional embodiment, Search Space of the PDCCH is configured as follows:

| | |
|---|---|
| Search Space ::= | SEQUENCE { |
| Search SpaceId | Search SpaceId, |
| controlResourceSetId | ControlResourceSetId |
| OPTIONAL, -- Cond SetupOnly | |
| monitoringSlotPeriodicityAndOffset | CHOICE { |
| sl1 | NULL, |
| sl2 | INTEGER (0..1), |
| sl4 | INTEGER (0..3), |
| sl5 | INTEGER (0..4), |
| sl8 | INTEGER (0..7), |
| sl10 | INTEGER (0..9), |
| sl16 | INTEGER (0..15), |
| sl20 | INTEGER (0..19), |
| sl40 | INTEGER (0..39), |
| sl80 | INTEGER (0..79), |
| sl160 | INTEGER (0..159), |
| sl320 | INTEGER (0..319), |
| sl640 | INTEGER (0..639), |
| sl1280 | INTEGER (0..1279), |
| sl2560 | INTEGER (0..2559) |
| } | |
| duration | INTEGER (2..2559) |
| ... | |
| } | |

Optionally, the foregoing DRX cycles are configured as follows:

| drx-LongCycleStartOffset | CHOICE { |
|---|---|
| ms10 | INTEGER(0..9), |
| ms20 | INTEGER(0..19), |
| ms32 | INTEGER(0..31), |
| ms40 | INTEGER(0..39), |
| ms60 | INTEGER(0..59), |
| ms64 | INTEGER(0..63), |
| ms70 | INTEGER(0..69), |
| ms80 | INTEGER(0..79), |
| ms128 | INTEGER(0..127), |
| ms160 | INTEGER(0..159), |
| ms256 | INTEGER(0..255), |
| ms320 | INTEGER(0..319), |
| ms512 | INTEGER(0..511), |
| ms640 | INTEGER(0..639), |
| ms1024 | INTEGER(0..1023), |
| ms1280 | INTEGER(0..1279), |
| ms2048 | INTEGER(0..2047), |
| ms2560 | INTEGER(0..2559), |
| ms5120 | INTEGER(0..5119), |
| ms10240 | INTEGER(0..10239) |
| } | |

It should be noted that the number of monitoring durations in each DRX cycle among a plurality of DRX cycles may be the same or different. In an embodiment, in a case that the number of monitoring durations in each DRX cycle is the same, M is less than the number of monitoring durations in a DRX cycle. For example, in a case that the number of monitoring durations in each of a plurality of DRX cycles is 4, M is a positive integer less than or equal to 3. In another embodiment, in a case that the numbers of monitoring durations in a plurality of DRX cycles are different, M is less than or equal to a minimum value of the numbers of monitoring durations in the DRX cycles. For example, in a case that the number of monitoring durations in one of a plurality of DRX cycles is 2, the number of monitoring durations in any other DRX cycle is 4, M is a positive integer less than or equal to 2.

Figure 3:
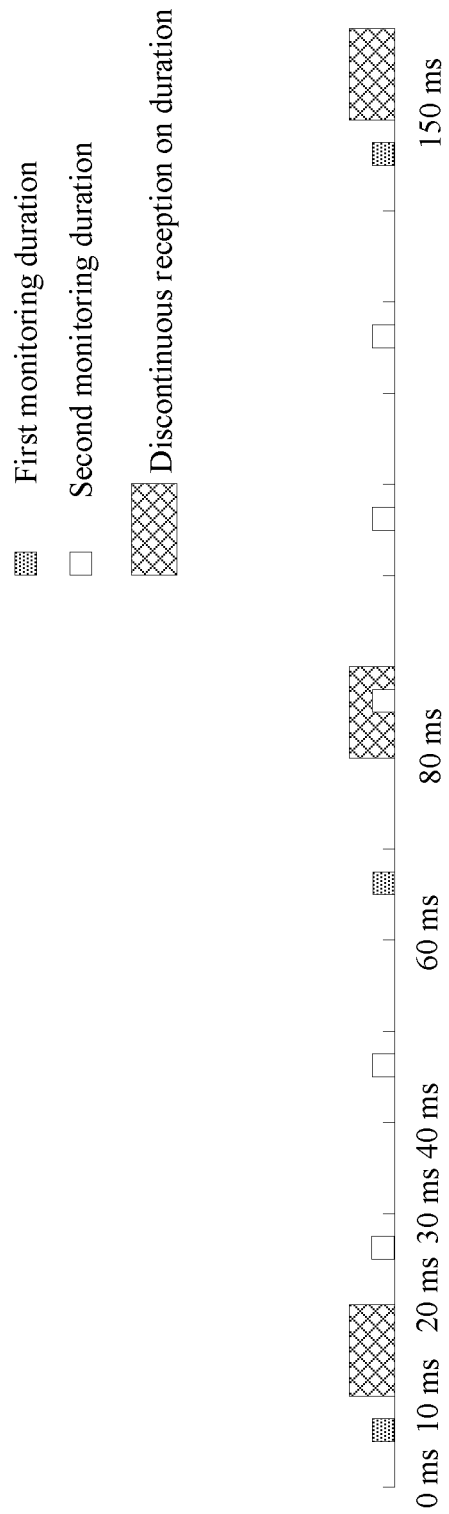
FIG. 3 is a diagram of distribution of monitoring durations and DRX on durations in a PDCCH monitoring method according to an embodiment of this disclosure.

Information such as monitoring period, monitoring length of time, and start time of the foregoing M first monitoring durations can be set according to actual conditions. As shown in FIG. 3, in an optional embodiment, a monitoring period of a power saving PDCCH configured by the network is 20 ms, and monitoring starts at 5 ms, 25 ms, 45 ms, 65 ms, 85 ms, 105 ms, 125 ms, 145 ms, and so on. After determining M first monitoring durations, the terminal will monitor the foregoing PDCCH in each first monitoring duration, to obtain the power saving indication information transmitted on the PDCCH.

In this embodiment of this disclosure, the M first monitoring durations among a plurality of monitoring durations in each DRX cycle are selected for monitoring a power saving PDCCH, so as to obtain corresponding power saving indication information. In this way, in a case that a power saving PDCCH monitoring period does not match the corresponding DRX cycle configured, the power saving PDCCH monitoring can be performed within limited monitoring durations, to reduce power consumption in the power saving PDCCH monitoring, thereby reducing the power consumption of the terminal.

Further, in an optional embodiment, the foregoing M monitoring durations are located before a target orthogonal frequency division multiplexing (OFDM) symbol, and the target OFDM symbol is a starting OFDM symbol of an on duration of the DRX cycle. Monitoring the power saving PDCCH in the monitoring durations before the starting OFDM symbol of the on duration of the DRX cycle can avoid missing PDCCH monitoring in an on duration of a current DRX cycle, reducing a delay in data transmission.

It should be understood that the foregoing M first monitoring durations may be monitoring durations located at any position before the target OFDM symbol. In an optional embodiment, the M first monitoring durations may be last M monitoring durations among L monitoring durations sorted in chronological order, and the L monitoring durations are monitoring durations located before the target OFDM symbol among monitoring durations corresponding to the DRX cycle.

Optionally, to avoid missing PDCCH monitoring in an on duration of a current DRX cycle, a time interval between the first monitoring duration and the target OFDM symbol is greater than a preset value. The preset value may be set according to actual needs, for example, it may be 1 ms. The time interval between the first monitoring duration and the target OFDM symbol refers to duration between end time of the first monitoring duration and the target OFDM symbol.

It should be noted that a value of M may be indicated by the network device, or may be agreed upon by a protocol. The specific value can be set according to actual needs. For example, in an optional embodiment, M is 1 or 2. That is, in this embodiment, one or two first monitoring durations can be selected.

In a case that the value of M is 2, PDCCHs monitored in different first monitoring durations of one DRX cycle are of the same or different types. A type of the PDCCH includes at least one of group common PDCCH or UE specific PDCCH. It should be noted that the group common PDCCH is monitored in a common search space, and the UE specific PDCCH is monitored in a UE specific search space.

In one embodiment, two PDCCHs monitored in first monitoring durations may be both group common PDCCHs or UE specific PDCCHs. In another embodiment, two PDCCHs monitored in first monitoring durations may be one group common PDCCH and one UE specific PDCCH. For example, a PDCCH monitored in a first monitoring duration is a group common PDCCH, and a PDCCH monitored in a next first monitoring duration is a UE specific PDCCH; or a PDCCH monitored in a first monitoring duration is a UE specific PDCCH, and a PDCCH monitored in a next first monitoring duration is a group common PDCCH.

Optionally, in an embodiment of this disclosure, a type of the PDCCH monitored in the first monitoring durations may be indicated by the network device.

It should also be noted that the PDCCH is not monitored in monitoring durations other than the first monitoring durations. In other words, in an optional embodiment, the PDCCH is not monitored in N-M second monitoring durations, where the N-M second monitoring durations are monitoring durations other than the M first monitoring durations among monitoring durations corresponding to the DRX cycle.

Figure 4:
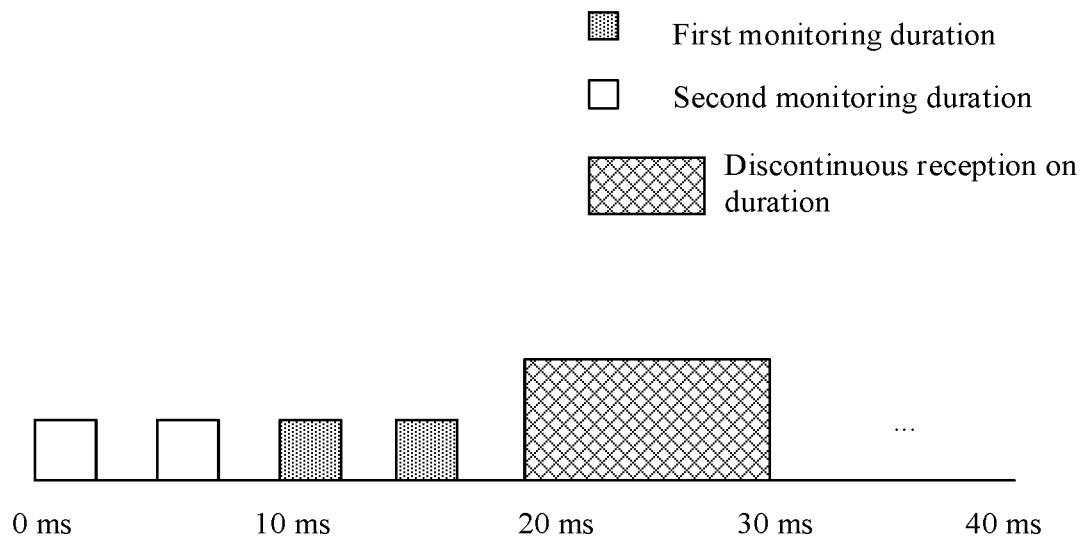
FIG. 4 is a diagram of distribution of monitoring durations and DRX on durations in a PDCCH monitoring method according to an embodiment of this disclosure.

Further, each monitoring duration may include one or more monitoring occasions. To ensure that the power saving indication information transmitted on the PDCCH can be correctly monitored, the foregoing first monitoring duration includes at least one valid monitoring occasion. A corresponding monitoring duration may be regarded as a valid monitoring duration only when at least one valid monitoring occasion exists. As shown in FIG. 3 and FIG. 4, except for the valid first monitoring duration, other monitoring durations are second monitoring durations, that is, invalid monitoring durations. In this embodiment of this disclosure, the PDCCH is not monitored in the second monitoring duration.

Optionally, in an optional embodiment, the valid monitoring occasion satisfies at least one of the following conditions:
- an OFDM symbol in which the monitored PDCCH is located does not include a first symbol indicated by higher layer signaling, and the first symbol is an uplink symbol and/or a flexible symbol;
- an OFDM symbol in which the monitored PDCCH is located does not include a second symbol indicated by downlink control information DCI, and the second symbol is an uplink symbol and/or a flexible symbol;
- an OFDM symbol in which the monitored PDCCH is located does not include a third symbol indicated by RRC, and the third symbol is a symbol for performing measurement on synchronization signal block SSB or channel state information reference signal (CSI-RS); or
- an OFDM symbol in which the monitored PDCCH is located does not include K symbols before or after the second symbol, where K is a positive integer.

Optionally, the power saving indication information is used to indicate whether the terminal needs to monitor a PDCCH in an on duration of a first DRX in a plurality of serving cells, where the on duration of the first DRX is an on duration of a current DRX or an on duration of next T DRXs after a current time point, and T is a positive integer.

Further, the PDCCH transmitting the power saving indication information may also indicate any one of the following:
- that the terminal performs bandwidth part (BWP) switching;
- that the terminal activates or deactivates an object, where the object is a cell group or a carrier group;
- that the terminal stops PDCCH monitoring within a preset period;
- that the terminal performs receive antenna switching;
- slot structure of the terminal;
- that the terminal triggers channel state information (CSI) reporting;
- that the terminal triggers sounding reference signal (SRS) transmission;
- that the terminal receives a tracking reference signal (TRS);
- that the terminal receives a CSI-RS;
- that the terminal performs at least one of beam management (BM) measurement, radio link monitoring (RLM) measurement, or radio resource management (RRM) measurement;
- at least one of a total time length, a remaining time length, and a channel access priority of channel occupancy time (COT) in new radio unlicensed (NR-U) of the terminal;
- power control parameter for transmitting an uplink physical channel and/or a physical signal by the terminal; or
- that the terminal activates different DRX configurations or search space configurations.

For better understanding of this disclosure, the following describes the embodiment in detail with reference to FIG. 3 and FIG. 4.

Solution 1: Assuming that the DRX cycle configured by the network device is 70 ms, DRX on duration starts at 10 ms, 80 ms, 150 ms, and so on. Assuming that a subcarrier spacing of a slot is 15 kHz, a unit slot of a cycle for a search space of the PDCCH is equivalent to ms. Assuming that the monitoring period of the power saving PDCCH configured by the network device is 20 ms, monitoring starts at 5 ms, 25 ms, 45 ms, 65 ms, 85 ms, 105 ms, 125 ms, 145 ms, and so on.

As shown in FIG. 3, in this solution, because a 70 ms cycle is absent in configuration of the search space of the PDCCH, and monitoring starts at 5 ms, the network device may configure a shorter monitoring period through the search space, for example, the monitoring period is 20 ms and monitoring starts at 10 ms. Then, based on the criteria of the most recent monitoring duration before the DRX on duration, the power saving PDCCH monitoring corresponding to 10 ms starts at 5 ms, the power saving PDCCH monitoring corresponding to 80 ms starts at 65 ms, and the power saving PDCCH monitoring corresponding to 150 ms starts at 145 ms.

Each monitoring duration corresponds to a plurality of monitoring occasions. For example, the duration includes two slots, and each slot has two monitoring occasions, then the UE can perform monitoring in these four monitoring occasions.

Solution 2: Assuming that the DRX cycle configured by the network device is 160 ms, DRX on duration starts at 20 ms, 180 ms, and so on. Assuming that a subcarrier spacing of a slot is 15 kHz, a unit slot of a cycle for a search space of the PDCCH is equivalent to ms. Assuming that the monitoring period of the power saving PDCCH configured by the network device is 20 ms, monitoring starts at 0 ms, 5 ms, 10 ms, 15 ms, and so on.

As shown in FIG. 4, the terminal determines the two most recent PDCCH monitoring durations as the monitoring durations of the power saving PDCCH, for example, the monitoring durations starting at 10 ms and 15 ms as the power saving PDCCH monitoring durations.

Optionally, the UE specific power saving PDCCH monitoring may be performed in these two monitoring durations.

Optionally, the group common power saving PDCCH monitoring may be performed in these two monitoring durations.

Optionally, the group common power saving PDCCH monitoring first, and then the UE specific power saving PDCCH monitoring may be performed in these two monitoring durations, or the UE specific power saving PDCCH monitoring first, and then the group common power saving PDCCH monitoring may be performed in these two monitoring durations.

Optionally, the UE determines that N monitoring durations before the DRX cycle are valid durations, where N may be configured by the network.

Figure 5:
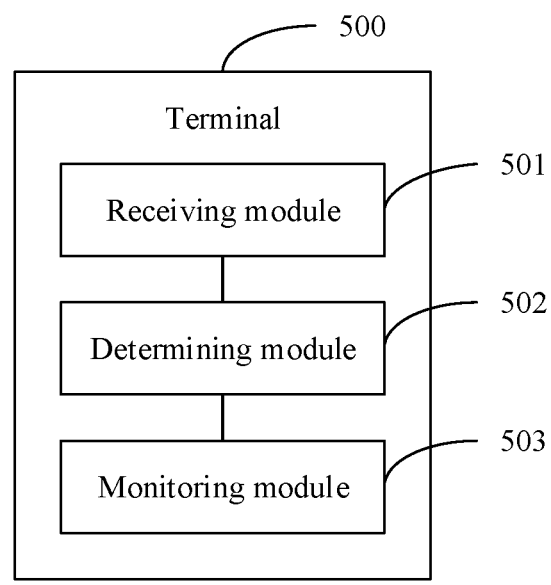
FIG. 5 is a structural diagram of a terminal according to an embodiment of this disclosure.

Referring to FIG. 5, FIG. 5 is a structural diagram of a terminal according to an embodiment of this disclosure. As shown in FIG. 5, the terminal 500 includes:
- a receiving module 501, configured to receive configuration information sent by a network device, where the configuration information is used to configure a monitoring duration;
- a determining module 502, configured to determine M first monitoring durations from monitoring durations in each DRX cycle, where M is a positive integer, and the number N of monitoring durations in at least one DRX cycle is greater than M; and
- a monitoring module 503, configured to monitor a PDCCH in the M first monitoring durations, where the PDCCH is used to transmit power saving indication information.

Optionally, the M first monitoring durations are located before a target OFDM symbol, and the target OFDM symbol is a starting OFDM symbol of an on duration of the DRX cycle.

Optionally, the M first monitoring durations are last M monitoring durations among L monitoring durations sorted in chronological order, and the L monitoring durations are monitoring durations located before the target OFDM symbol among monitoring durations corresponding to the DRX cycle.

Optionally, a time interval between the first monitoring duration and the target OFDM symbol is greater than a preset value.

Optionally, a value of M is 1 or 2.

Optionally, in a case that the value of M is 2, PDCCHs monitored in different first monitoring durations of one DRX cycle are of the same or different types.

Optionally, a type of the PDCCH includes at least one of group common PDCCH or UE specific PDCCH.

Optionally, a type of the PDCCH is indicated by the network device.

Optionally, the PDCCH is not monitored in N-M second monitoring durations, where the N-M second monitoring durations are monitoring durations other than the M first monitoring durations among the monitoring durations corresponding to the DRX cycle.

Optionally, the first monitoring duration includes at least one valid monitoring occasion.

Optionally, the valid monitoring occasion satisfies at least one of the following conditions:

an OFDM symbol in which the monitored PDCCH is located does not include a first symbol indicated by higher layer signaling, and the first symbol is an uplink symbol and/or a flexible symbol;

an OFDM symbol in which the monitored PDCCH is located does not include a second symbol indicated by DCI, and the second symbol is an uplink symbol and/or a flexible symbol;

an OFDM symbol in which the monitored PDCCH is located does not include a third symbol indicated by RRC, and the third symbol is a symbol for performing SSB or CSI-RS measurement; or an OFDM symbol in which the monitored PDCCH is located does not include K symbols before or after the second symbol, where K is a positive integer.

Optionally, the power saving indication information is used to indicate whether the terminal needs to monitor a PDCCH in an on duration of a first DRX in a plurality of serving cells, where the on duration of the first DRX is an on duration of a current DRX or an on duration of next T DRXs after a current time point, and T is a positive integer.

The terminal provided in this embodiment of this disclosure is capable of implementing various processes that are implemented by the terminal in the method embodiments of FIG. 2 to FIG. 4. To avoid repetition, details are not described herein again.

Figure 6:
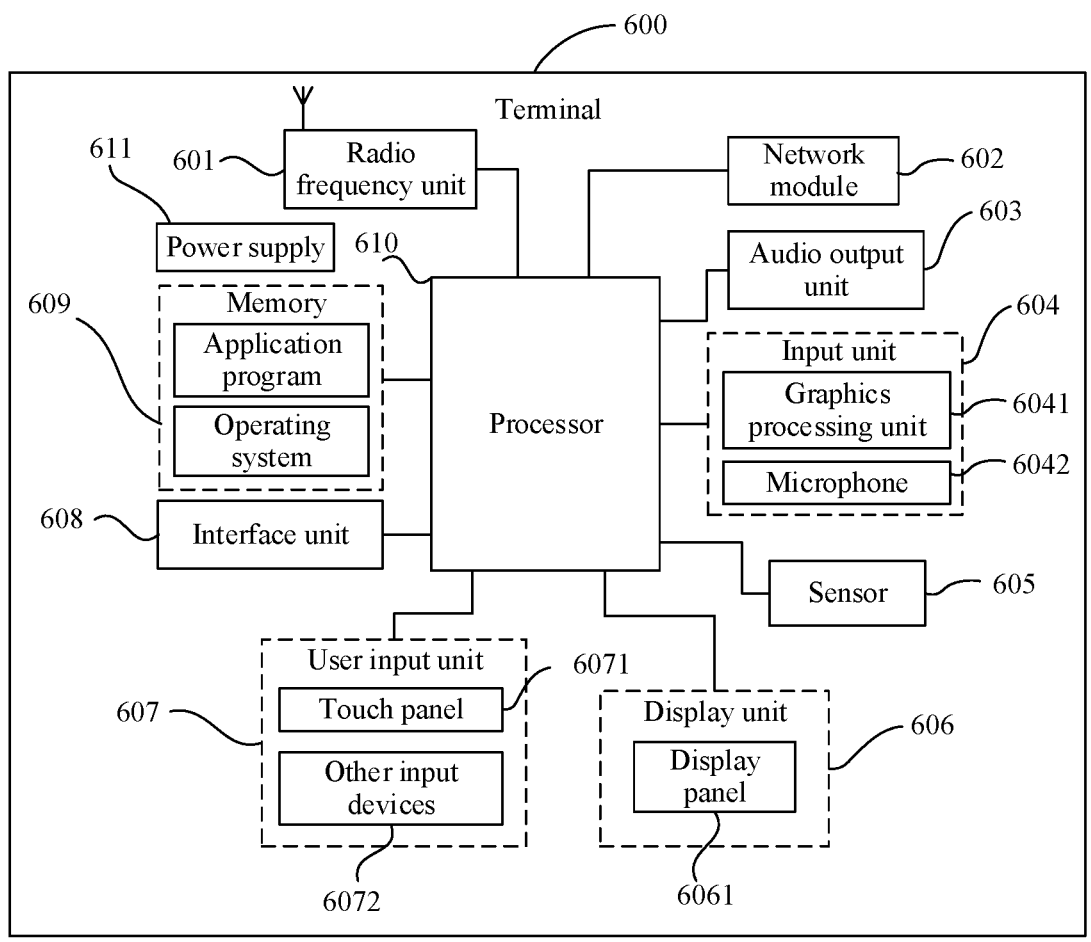
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 601 may be configured to receive configuration information sent by a network device, where the configuration information is used to configure a monitoring duration.

The sensor 605 may be configured to determine M first monitoring durations from monitoring durations in each DRX cycle, where M is a positive integer, and the number N of monitoring durations in at least one DRX cycle is greater than M.

Optionally, the M first monitoring durations are located before a target OFDM symbol, and the target OFDM symbol is a starting OFDM symbol of an on duration of the DRX cycle.

Optionally, the M first monitoring durations are last M monitoring durations among L monitoring durations sorted in chronological order, and the L monitoring durations are monitoring durations located before the target OFDM symbol among monitoring durations corresponding to the DRX cycle.

Optionally, a time interval between the first monitoring duration and the target OFDM symbol is greater than a preset value.

Optionally, a value of M is 1 or 2.

Optionally, in a case that the value of M is 2, PDCCHs monitored in different first monitoring durations of one DRX cycle are of the same or different types.

Optionally, a type of the PDCCH includes at least one of group common PDCCH or UE specific PDCCH.

Optionally, a type of the PDCCH is indicated by the network device.

Optionally, the PDCCH is not monitored in N-M second monitoring durations, where the N-M second monitoring durations are monitoring durations other than the M first monitoring durations among the monitoring durations corresponding to the DRX cycle.

Optionally, the first monitoring duration includes at least one valid monitoring occasion.

Optionally, the valid monitoring occasion satisfies at least one of the following conditions:

an OFDM symbol in which the monitored PDCCH is located does not include a first symbol indicated by higher layer signaling, and the first symbol is an uplink symbol and/or a flexible symbol;

an OFDM symbol in which the monitored PDCCH is located does not include a second symbol indicated by DCI, and the second symbol is an uplink symbol and/or a flexible symbol;

an OFDM symbol in which the monitored PDCCH is located does not include a third symbol indicated by RRC, and the third symbol is a symbol for performing SSB or CSI-RS measurement; or an OFDM symbol in which the monitored PDCCH is located does not include K symbols before or after the second symbol, where K is a positive integer.

Optionally, the power saving indication information is used to indicate whether the terminal needs to monitor a PDCCH in an on duration of a first DRX in a plurality of serving cells, where the on duration of the first DRX is an on duration of a current DRX or an on duration of next T DRXs after a current time point, and T is a positive integer.

It should be understood that in this embodiment of this disclosure, the radio frequency unit 601 may be configured to receive and send information, or to receive and send a signal in a call process, and specifically, after receiving downlink data from a base station, send the downlink data to the processor 610 for processing; and also send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides the user with wireless broadband Internet access by using the network module 602, for example, helping the user send or receive an email, browse a web page, access streaming media, and the like.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a telephone receiver, and the like.

The input unit 604 is configured to receive an audio or video signal. The input unit 604 may include a graphics processing unit (GPU) 6041 and a microphone 6042, and the GPU 6041 processes image data of a still picture or a video obtained by an image capture apparatus (for example, a camera) in an image capture mode or a video capture mode. A processed image frame may be displayed on the display unit 606. An image frame processed by the GPU 6041 may be stored in the memory 609 (or another storage medium) or sent by the radio frequency unit 601 or the network module 602. The microphone 6042 can receive a sound and can process the sound into audio data. The processed audio data can be converted, for outputting, into a format that can be sent to a mobile communication base station through the radio frequency unit 601 in a telephone call mode.

The terminal 600 further includes at least one sensor 605, for example, an optical sensor, a motion sensor, and other sensors. Specifically, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 may be configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be used to receive input digit or character information, and generate key signal input that is related to user setting and function control of the terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although the touch panel 6071 and the display panel 6061 are used as two separate components to implement input and output functions of the terminal in FIG. 6, the touch panel 6071 and the display panel 6061 may be integrated to implement the input and output functions of the terminal in some embodiments. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 608 may be used to receive input (for example, data information and electric power) from the external apparatus, and transmit the received input to one or more elements in the terminal 600; or may be used to transmit data between the terminal 600 and the external apparatus.

The memory 609 may be used to store a software program and various data. The memory 609 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 609 may include a high-speed random access memory, or may include a non-volatile memory, for example, at least one magnetic disk storage device, a flash memory device, or other volatile solid-state storage devices.

The processor 610 is a control center of the terminal, and is connected to all components of the terminal by using various interfaces and lines. By running or executing a software program and/or a module stored in the memory 609 and invoking data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 600 may further include the power supply 611 (for example, a battery) that supplies power to each component. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and capable of running on the processor 610. When the computer program is executed by the processor 610, the processes of the foregoing PDCCH monitoring method embodiments are implemented, with the same technical effects achieved. To avoid repetition, details are not described herein again.

An embodiment of this disclosure further provides a computer-readable storage medium, where the computer-readable storage medium stores a computer program. When the computer program is executed by a processor, the processes of the PDCCH monitoring method embodiments are implemented, with the same technical effects achieved. To avoid repetition, details are not described herein again. For example, the computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the methods described in the embodiments of this disclosure.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A PDCCH monitoring method, applied to a terminal and comprising:
   receiving configuration information sent by a network device, wherein the configuration information is used to configure a monitoring duration;
   determining M first monitoring durations from monitoring durations in each DRX cycle, wherein M is a positive integer, and the number N of monitoring durations in at least one DRX cycle is greater than M; and
   monitoring a PDCCH in the M first monitoring durations, wherein the PDCCH is used to transmit power saving indication information.

2. The method according to claim 1, wherein the M first monitoring durations are located before a target OFDM symbol, and the target OFDM symbol is a starting OFDM symbol of an on duration of the DRX cycle.

3. The method according to claim 2, wherein the M first monitoring durations are last M monitoring durations among L monitoring durations sorted in chronological order, and the L monitoring durations are monitoring durations located before the target OFDM symbol among monitoring durations corresponding to the DRX cycle.

4. The method according to claim 3, wherein a time interval between the first monitoring duration and the target OFDM symbol is greater than a preset value.

5. The method according to claim 1, wherein a value of M is 1 or 2.

6. The method according to claim 5, wherein in a case that the value of M is 2, PDCCHs monitored in different first monitoring durations of one DRX cycle are of the same or different types.

7. The method according to claim 6, wherein a type of the PDCCH comprises at least one of group common PDCCH or UE specific PDCCH; or,
   wherein a type of the PDCCH is indicated by the network device.

8. The method according to claim 1, wherein the PDCCH is not monitored in N-M second monitoring durations, and the N-M second monitoring durations are monitoring durations other than the M first monitoring durations among the monitoring durations corresponding to the DRX cycle.

9. The method according to claim 1, wherein the first monitoring duration comprises at least one valid monitoring occasion;
   wherein the valid monitoring occasion satisfies at least one of the following conditions:
   an OFDM symbol in which the monitored PDCCH is located does not comprise a first symbol indicated by higher layer signaling, and the first symbol is an uplink symbol and/or a flexible symbol;

an OFDM symbol in which the monitored PDCCH is located does not comprise a second symbol indicated by DCI, and the second symbol is an uplink symbol and/or a flexible symbol;

an OFDM symbol in which the monitored PDCCH is located does not comprise a third symbol indicated by RRC, and the third symbol is a symbol for performing SSB or CSI-RS measurement; or an OFDM symbol in which the monitored PDCCH is located does not comprise K symbols before or after the second symbol, wherein K is a positive integer.

10. The method according to claim 1, wherein the power saving indication information is used to indicate whether the terminal needs to monitor a PDCCH in an on duration of a first DRX in a plurality of serving cells, wherein the on duration of the first DRX is an on duration of a current DRX or an on duration of next T DRXs after a current time point, and T is a positive integer.

11. A terminal, comprising a memory, a processor, and a program stored in the memory and capable of running on the processor, wherein the program is executed by the processor to implement:

receiving configuration information sent by a network device, wherein the configuration information is used to configure a monitoring duration;

determining M first monitoring durations from monitoring durations in each DRX cycle, wherein M is a positive integer, and the number N of monitoring durations in at least one DRX cycle is greater than M; and monitoring a PDCCH in the M first monitoring durations, wherein the PDCCH is used to transmit power saving indication information.

12. The terminal according to claim 11, wherein the M first monitoring durations are located before a target OFDM symbol, and the target OFDM symbol is a starting OFDM symbol of an on duration of the DRX cycle.

13. The terminal according to claim 12, wherein the M first monitoring durations are last M monitoring durations among L monitoring durations sorted in chronological order, and the L monitoring durations are monitoring durations located before the target OFDM symbol among monitoring durations corresponding to the DRX cycle.

14. The terminal according to claim 13, wherein a time interval between the first monitoring duration and the target OFDM symbol is greater than a preset value.

15. The terminal according to claim 11, wherein a value of M is 1 or 2.

16. The terminal according to claim 15, wherein in a case that the value of M is 2, PDCCHs monitored in different first monitoring durations of one DRX cycle are of the same or different types.

17. The terminal according to claim 16, wherein a type of the PDCCH comprises at least one of group common PDCCH or UE specific PDCCH; or, wherein a type of the PDCCH is indicated by the network device.

18. The terminal according to claim 11, wherein the PDCCH is not monitored in N-M second monitoring durations, and the N-M second monitoring durations are monitoring durations other than the M first monitoring durations among the monitoring durations corresponding to the DRX cycle; and/or, wherein the power saving indication information is used to indicate whether the terminal needs to monitor a PDCCH in an on duration of a first DRX in a plurality of serving cells, wherein the on duration of the first DRX is an on duration of a current DRX or an on duration of next T DRXs after a current time point, and T is a positive integer.

19. The terminal according to claim 11, wherein the first monitoring duration comprises at least one valid monitoring occasion;

wherein the valid monitoring occasion satisfies at least one of the following conditions:

an OFDM symbol in which the monitored PDCCH is located does not comprise a first symbol indicated by higher layer signaling, and the first symbol is an uplink symbol and/or a flexible symbol;

an OFDM symbol in which the monitored PDCCH is located does not comprise a second symbol indicated by DCI, and the second symbol is an uplink symbol and/or a flexible symbol;

an OFDM symbol in which the monitored PDCCH is located does not comprise a third symbol indicated by RRC, and the third symbol is a symbol for performing SSB or CSI-RS measurement; or an OFDM symbol in which the monitored PDCCH is located does not comprise K symbols before or after the second symbol, wherein K is a positive integer.

20. A computer-readable storage medium, wherein the computer-readable storage medium stores a computer program, and the computer program is executed by a processor to implement:

receiving configuration information sent by a network device, wherein the configuration information is used to configure a monitoring duration;

determining M first monitoring durations from monitoring durations in each DRX cycle, wherein M is a positive integer, and the number N of monitoring durations in at least one DRX cycle is greater than M; and monitoring a PDCCH in the M first monitoring durations, wherein the PDCCH is used to transmit power saving indication information.

* * * * *